(12) United States Patent
Conner et al.

(10) Patent No.: US 7,664,037 B2
(45) Date of Patent: Feb. 16, 2010

(54) MULTICHANNEL MESH NETWORK, MULTICHANNEL MESH ROUTER AND METHODS FOR ROUTING USING BOTTLENECK CHANNEL IDENTIFIERS

(75) Inventors: W. Steven Conner, Hillsboro, OR (US); Mark Yarvis, Portland, OR (US); Anand Rangarajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 11/030,592

(22) Filed: Jan. 4, 2005

(65) Prior Publication Data

US 2006/0146712 A1 Jul. 6, 2006

(51) Int. Cl.
*H04L 12/28* (2006.01)
*H04L 12/56* (2006.01)
(52) U.S. Cl. .................. 370/238; 370/389
(58) Field of Classification Search .......... None
See application file for complete search history.

(56) References Cited

U.S. PATENT DOCUMENTS

| | | | |
|---|---|---|---|
| 5,649,108 A | 7/1997 | Spiegel et al. | |
| 6,363,319 B1 | 3/2002 | Hsu | |
| 6,580,979 B2 | 6/2003 | Payton et al. | |
| 6,606,303 B1 | 8/2003 | Hassel et al. | |
| 6,621,795 B1 * | 9/2003 | Redi et al. | 370/235 |
| 6,639,897 B1 * | 10/2003 | Shiomoto et al. | 370/238 |
| 6,816,460 B1 | 11/2004 | Ahmed et al. | |
| 6,901,048 B1 * | 5/2005 | Wang et al. | 370/228 |
| 7,246,172 B2 | 7/2007 | Yoshiba et al. | |
| 7,471,633 B2 | 12/2008 | Yarvis et al. | |
| 2002/0196734 A1 | 12/2002 | Tanaka et al. | |
| 2003/0009582 A1 * | 1/2003 | Qiao et al. | 709/233 |
| 2003/0181211 A1 * | 9/2003 | Razavilar et al. | 455/450 |
| 2004/0229566 A1 * | 11/2004 | Wang et al. | 455/63.1 |

FOREIGN PATENT DOCUMENTS

| | | |
|---|---|---|
| EP | 1473894 A2 | 11/2004 |
| JP | 07066835 | 3/1995 |
| JP | 2004208068 | 7/2004 |
| TW | 200412805 | 7/2004 |
| WO | WO-2004/014091 A1 | 2/2004 |
| WO | WO-2004/053940 A2 | 6/2004 |

OTHER PUBLICATIONS

"International Search Report for corresponding PCT Application Ser. No. PCT/US2006/000485", (May 10, 2006), 4 pgs.

(Continued)

*Primary Examiner*—Ricky Ngo
*Assistant Examiner*—Clemence Han
(74) *Attorney, Agent, or Firm*—Schwegman, Lundberg & Woessner, P.A.; Gregory J. Gorrie

(57) ABSTRACT

Nodes of a multichannel mesh network generate channel-metric matrices for routing packets to destinations based on a bottleneck channel identified for the source-destination pair. The identification of bottleneck channels increases the diversity among the different communication channels used along a route. This link-state routing approach may allow better paths to be found.

25 Claims, 4 Drawing Sheets

OTHER PUBLICATIONS

De Couto, D. S., et al., "A High-Throughput Path Metric for Multi-Hop Wireless Routing", *Proceedings of the 9th Annual Conference on Mobile Computing and Networking (MobiCom '03)*, (2003), 134-146.

Draves, R., et al., "Routing in Multi-Radio, Multi-Hop Wireless Mesh Networks", *Proceedings of the 10th Annual International Conference on Mobile Computing and Networking (MobiCom '04)*, (2004), 114-126.

Peterson, L. L., et al., *In: Computer Networks: A Systems Approach*, Morgan Kaufmann Publishers, San Francisco, CA, (2003), 285-287.

Yarvis, M. D., et al., "Real-World Experiences With an Interactive Ad Hoc Sensor Network", *International Workshop on Ad Hoc Networking (IWAHN 2002)*, (Aug. 2002), 9 pgs.

"U.S. Appl. No. 11/030,593 Notice of Allowance mailed Aug. 22, 2008", 18 pgs.

\* cited by examiner

- - - - LINK ON CHANNEL 1
———— LINK ON CHANNEL 2
········ LINK ON CHANNEL 3

MULTICHANNEL MESH NETWORK, MULTICHANNEL MESH ROUTER AND METHODS FOR ROUTING USING BOTTLENECK CHANNEL IDENTIFIERS

RELATED APPLICATIONS

This patent application is related to U.S. patent application Ser. No. 11/030,593, entitled "MULTICHANNEL MESH ROUTER AND METHODS FOR PATH SELECTION IN A MULTICHANNEL MESH NETWORK" and filed concurrently herewith.

TECHNICAL FIELD

Some embodiments of the present invention pertain to wireless communications. Some embodiments pertain to packet routing in wireless communication networks. Some embodiments pertain to multicarrier communications.

BACKGROUND

Some conventional communication networks route packets among nodes of the network using routing tables that are stored in the nodes. The routing tables generally identify a next-hop node based on the packet's destination. The next-hop node is generally the same for all packets having the same destination regardless of the packet's originating node. The routing tables are conventionally generated by selecting paths through the network in a hop-by-hop fashion based on next-hops with the lowest cost. In some wireless networks, this conventional routing approach may not select the best path through the network because the frequencies and/or time slots used by the communication links along a given path may interfere with each other resulting in increased packet delays, increased packet retransmissions, and reduced channel bandwidth.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
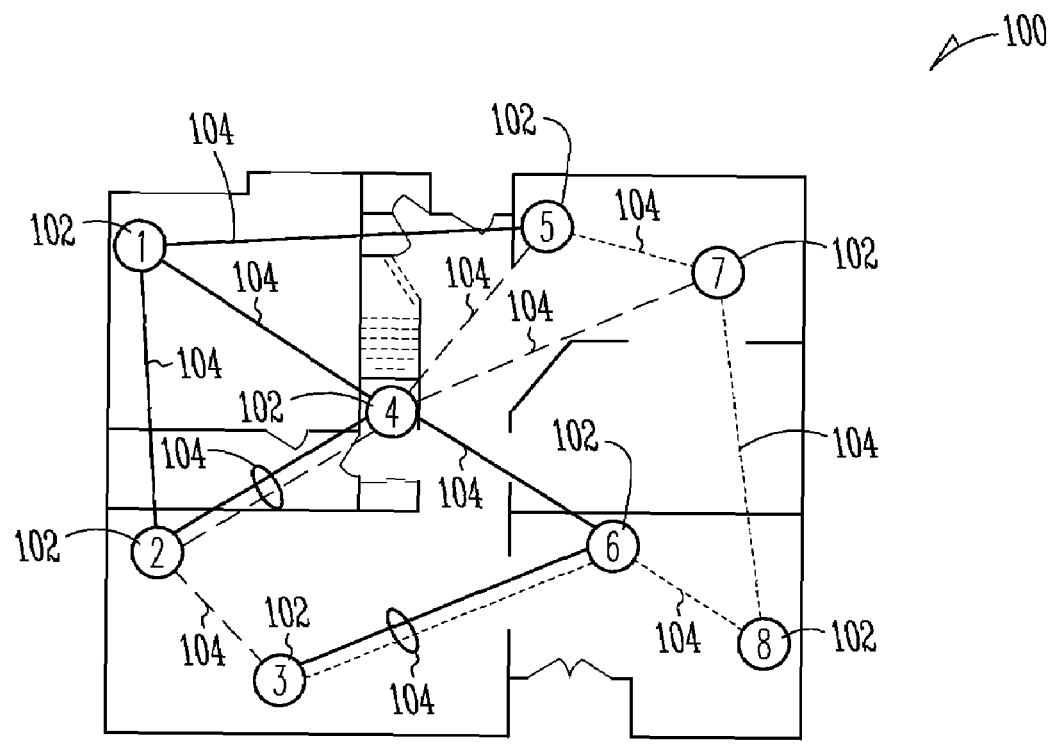
FIG. 1 illustrates a multichannel wireless mesh network in accordance with some embodiments of the present invention.

FIG. 1 illustrates a multichannel wireless mesh network in accordance with some embodiments of the present invention. Multichannel wireless mesh network 100 may comprise a plurality of wireless communication nodes 102 that may communicate with each other over one or more wireless communication channels 104. In some embodiments, at least some of wireless communication nodes 102 communicate with other nodes 102 using more than one wireless communication channel 104. In some embodiments, some wireless communication nodes 102 communicate with other nodes 102 using only one communication channel.

For example, in network 100, node "5" may communicate with node "4" using a first communication channel (e.g., channel one), node "5" may communicate with node "1" using a second communication channel (e.g., channel two), and node "5" may communicate with node "7" using a third communication channel (e.g., channel three). Node "1", for example, may communicate with nodes 2, 4 and 5 using only the first channel (e.g., channel one). Node "3", for example, may communicate with node "2" using the first communication channel (e.g., channel one) and may communicate with node "6" using both the second and third communication channels (e.g., channels 2 and 3). Although FIG. 1 illustrates a mesh network utilizing three communication channels, the scope of the invention is not limited in this respect. Some embodiments of the present invention are equally applicable to any mesh network utilizing one or more communication channels.

The use of two or more orthogonal wireless communication channels in mesh network 100 may significantly increase the ability of nodes 102 to communicate and route packets therebetween. In a single-channel mesh network, any one node's transmission on a particular communication channel may potentially interfere with other node's communicating on that channel depending on the distance between nodes in network 100. This may result in increased collisions, increased dropped packets, and increased packet retransmissions.

In accordance with some embodiments of the present invention, nodes 102 generate channel-metric matrices for each of the destination nodes of network 100. The channel-metric matrices identify next hop nodes for each of a plurality of bottleneck channels. Source nodes may tag originating packets to identify one of the bottleneck channels associated with a destination node of the originating packets. Intermediate nodes may select a next-hop node and one of communication channels 104 for forwarding received packets from a channel-metric matrix based on the destination node and the bottleneck channel identified within the received packets.

In some embodiments, a packet's next hop node and associated communication channel for transmission may be determined not only by the packet's destination node, but also by the bottleneck channel determined for that destination node by the packet's source node. In some embodiments, packets carry their bottleneck channel information in a tag or other identifier included in the packets by their source node. In some embodiments, this link-state routing approach used to generate the channel-metric matrices may allow a best end-to-end path to be found through a multi-channel mesh network.

Figure 2:
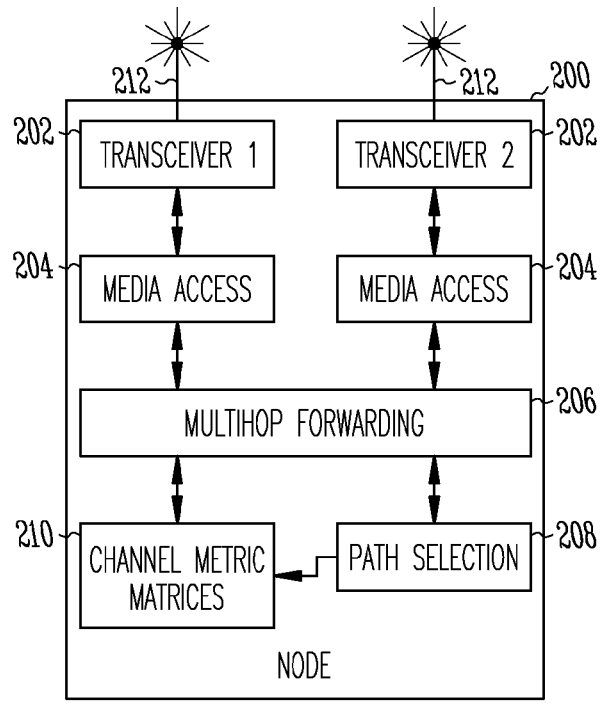
FIG. 2 is a functional block diagram of a multichannel wireless communication node in accordance with some embodiments of the present invention.

FIG. 2 is a functional block diagram of a multichannel wireless communication node in accordance with some embodiments of the present invention. Multichannel wireless communication node 200 may be suitable for use as any one or more of multichannel wireless communication nodes 102 (FIG. 1). In some embodiments, multichannel wireless communication node 200 may be a multichannel mesh router.

In accordance with some embodiments, multichannel wireless communication node 200 may include two or more transceivers 202, each associated with a particular wireless communication channel. Multichannel wireless communication node 200 may also include media access controllers 204 associated with one of transceivers 202. Multichannel wireless communication node 200 may also comprise multihop forwarding circuitry 206 for forwarding packets and path selection circuitry 208 to generate channel-metric matrices 210 as described in more detail below. Multichannel wireless communication node 200 may also be coupled with one or more antennas 212 for communicating over wireless communication channels 104 (FIG. 1).

In some embodiments, wireless communication node 200 may transmit and receive orthogonal frequency division multiplexed (OFDM) communication signals. In some embodiments, transceivers 202 may transmit and receive on multicarrier communication channels. The multicarrier communication channel may be within a predetermined frequency spectrum and may comprise a plurality of orthogonal subcarriers. In some embodiments, the orthogonal subcarriers may be closely spaced OFDM subcarriers. To achieve orthogonality between closely spaced subcarriers, in some embodiments, each subcarrier may have a null at substantially a center frequency of the other subcarriers.

In some embodiments, the orthogonality between the communication channels may be achieved through a frequency-division multiplexing (FDM) technique, a time-division multiplexing (TDM) technique, a code-division multiplexing (CDM) technique, or combinations thereof.

In some embodiments, the frequency spectrums for the multicarrier communication channels may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multichannel wireless communication node 200 may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multichannel wireless communication node 200 may transmit and/or receive RF communications in accordance with specific communication standards, such as the Institute of Electrical and Electronics Engineers (IEEE) standards including IEEE 802.11(a), 802.11(b), and/or 802.11(g/h) standards for wireless local area networks (WLANs), including the IEEE 802.11(s) standard for wireless mesh networks, although multichannel wireless communication node 200 may also be suitable to transmit and/or receive communications in accordance with other techniques. Antennas 212 may comprise one or more directional or omnidirectional antennas, including, for example, dipole antennas, monopole antennas, patch antennas, loop antenna, microstrip antennas or other types of antennas suitable for reception and/or transmission of RF signals.

Although multichannel wireless communication node 200 is illustrated as a wireless communication device, multichannel wireless communication node 200 may be almost any wireless or wireline communication device, including a general purpose processing or computing system. In some embodiments, multichannel wireless communication node 200 may be a battery-powered device.

Although multichannel wireless communication node 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of multichannel wireless communication node 200 may refer to one or more processes operating on one or more processing elements.

Figure 3:
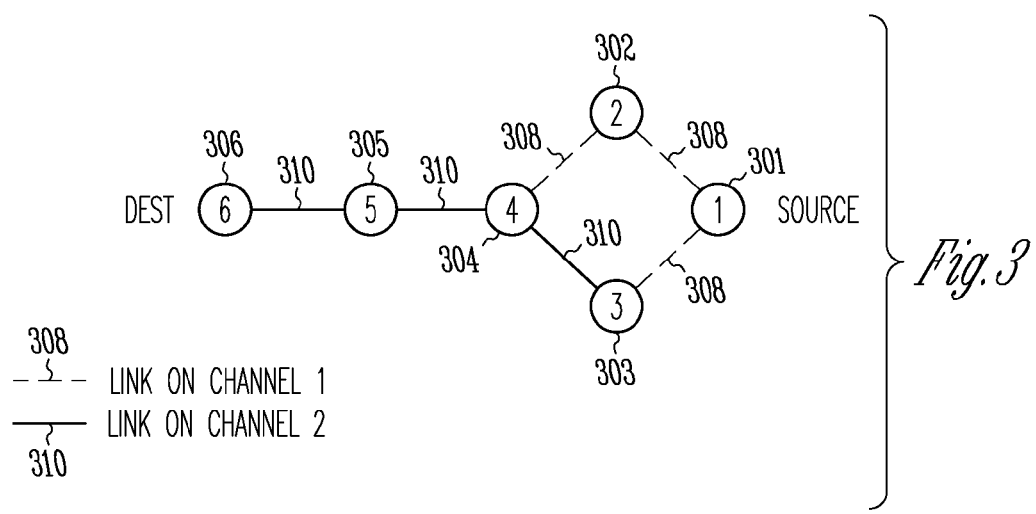
FIG. 3 illustrates a simplified multichannel wireless mesh network in accordance with some embodiments of the present invention.

FIG. 3 illustrates a simplified multichannel wireless mesh network in accordance with some embodiments of the present invention. Multichannel mesh network 300 is a simplified network that may be used to illustrate the generation and use of channel-metric matrices. Mesh network 300 comprises nodes 301 through 306 coupled by communication channels 308 and 310 as illustrated. Communication channels 308 and 310 may be orthogonal channels. In this illustration, node "1" may be a source node and node "6" may be a destination node for packets originating at node "1".

Figure 4A:
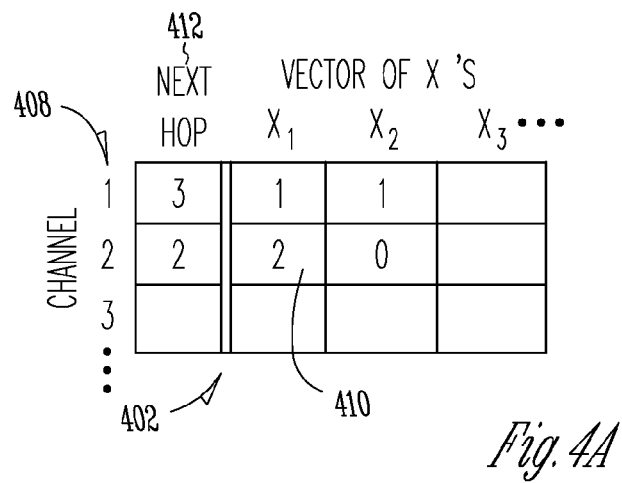
FIGS. 4A, 4B and 4C illustrate examples of channel-metric matrices in accordance with some embodiments of the present invention.
Figure 4B:
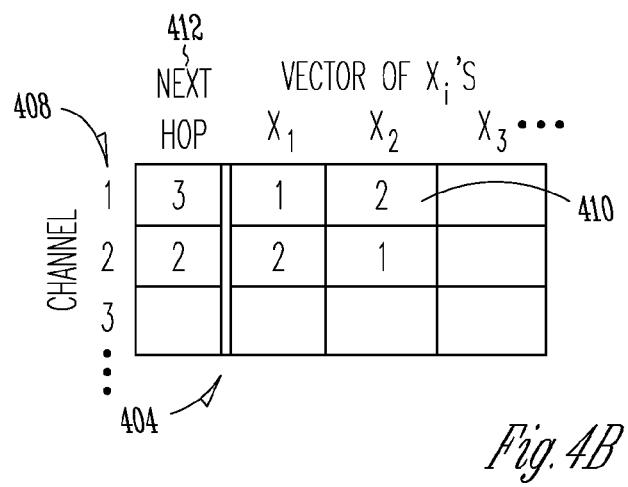
Figure 4C:
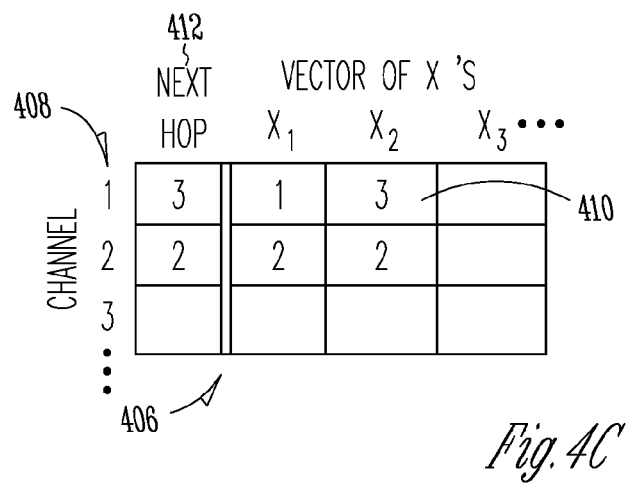

FIGS. 4A, 4B and 4C illustrate simplified examples of channel-metric matrices in accordance with some embodiments of the present invention. Channel-metric matrix 402 may be generated by a source node, such as node 301 (FIG. 3) for sending packets to destination node 304 (FIG. 3). Channel-metric matrix 404 may be generated by node 301 (FIG. 3) for sending packets to destination node 305 (FIG. 3). Channel-metric matrix 406 may be generated by a source node, such as node 301 (FIG. 3) for sending packets to destination node 306 (FIG. 3).

Tables 402, 404 and 406 identify bottleneck channels 408, a next hop in column 412 associated with each bottleneck channel 408 and a channel metric vector of elements (Xi) 410 for each bottleneck channel. FIGS. 4A, 4B and 4C illustrate channel metric vectors as rows of the table comprising elements (Xi) 410. Tables 402, 404 and 406 may illustrate that different bottleneck channels (i.e., associated with rows) may be associated with the same next hop node but may have different vectors.

Referring to FIGS. 3, 4A, 4B and 4C together, in accordance with some embodiments, source node 301 may select a bottleneck channel for originating packets by selecting the vector with the minimum cost metric. For example, the vector (e.g., row) with a minimum maximum Xi value may be selected, although the scope of the invention is not limited in this respect as other cost selecting functions may be used. For destination node "4", source node 301 may select channel 308 as the bottleneck channel based on the values in matrix 402. For destination node "5", either channel 308 or channel 310 may be selected as the bottleneck channel because the values in matrix 404 are the same for each channel. For destination node "6", source node 301 may select channel 310 as the bottleneck channel based on the values in matrix 406.

In this example, the $X_1$ column may indicate a cost associated with the use of the first channel (e.g., channel 308) to arrive at the destination node, and the $X_2$ may indicate a cost associated with the use of the second channel (e.g., channel 310) to arrive at the destination node. In matrix 406, the one in the $X_1$ column may indicate that channel one is used once when the next hop node is node "3" for packets originating at node "1". In matrix 406, the three in the $X_2$ column may indicate that channel two is used three times when the next hop node is node "3" for packets originating at node "1". When the next hop node is node "2" for packets originating at node "1", table 406 indicates that channel one is used twice and that channel two is used twice. In this example, channel two may be selected as the bottleneck channel by the source node "1" for destination node "6" because minimizing use of this channel along the path to node "6", with node "2" as the next hop, may result in less channel contention than minimizing use of other channels. The generation of channel metric tables is described in more detail below.

In some embodiments, source nodes may identify one of the bottleneck channels for each destination node to increase diversity among the plurality of communication channels used on a route to a destination node, although the scope of the invention is not limited in this respect. In some embodiments, the elements of the channel metric vectors are each associated with one of the communication channels and may comprise a weighted combination of one or more of a hop count, link bandwidth, airtime estimate, number of retransmissions, data rate, encoding rate, and/or modulation (QAM) level for the associated channels. Although not illustrated in FIGS. 4A, 4B and 4C, each next hop node identified in columns 412 may have a communication channel associated with it. The associated communication channel may be the communication channel that is used when that next hop node (i.e., row) is selected to route a packet.

Figure 5:
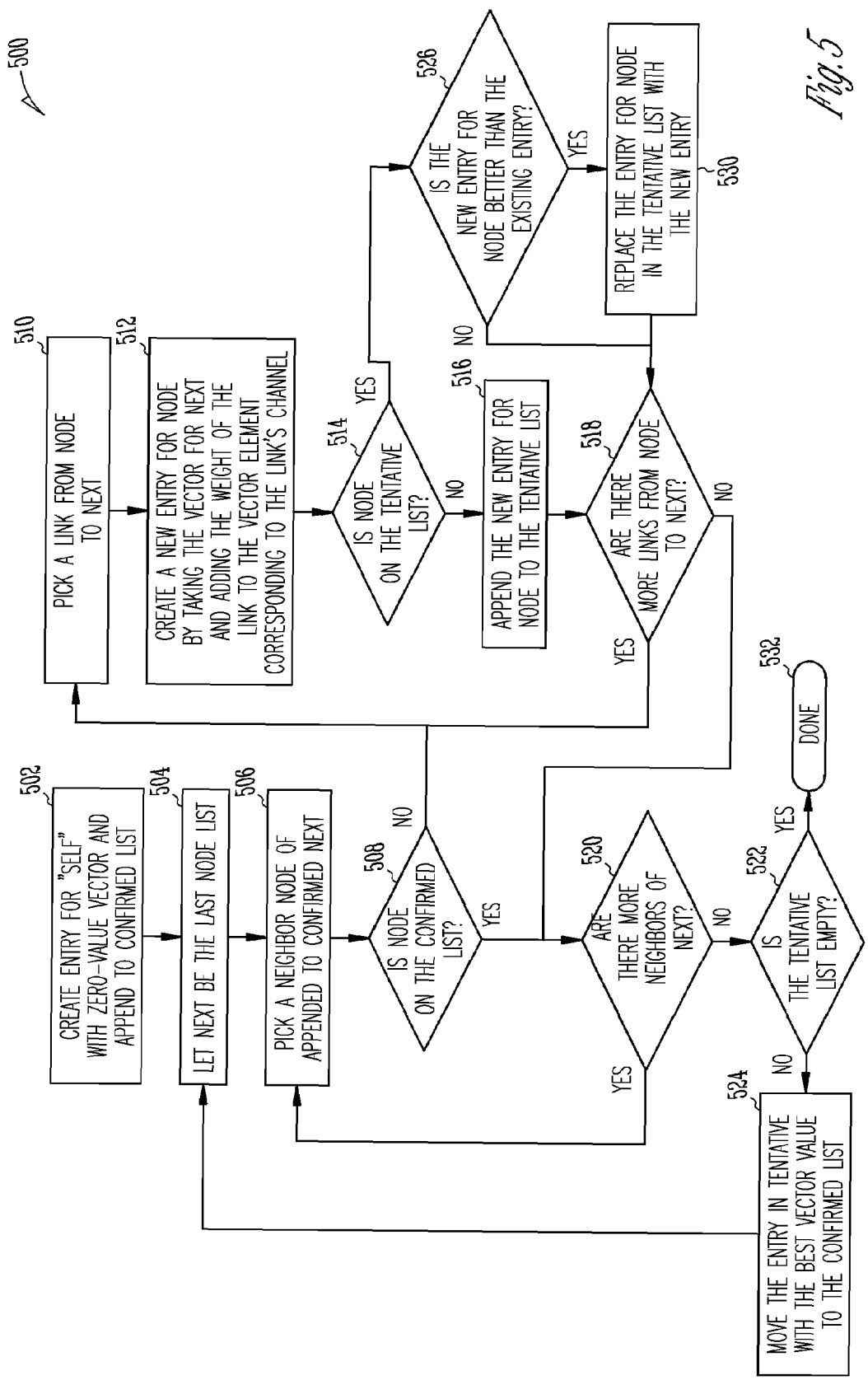
FIG. 5 is a flow chart of a procedure for generating channel-metric matrices in accordance with some embodiments of the present invention.

FIG. 5 is a flow chart of a procedure for generating channel-metric matrices in accordance with some embodiments of the present invention. Procedure 500 may be performed by each node of a multichannel mesh network to generate channel matrix tables for each destination node of the network.

In some embodiments, procedure 500 may generate channel-metric matrices that may allow the best path to be selected in a multi-channel mesh network, such as network 100 (FIG. 1) or network 300 (FIG. 3). In these embodiments, the route selection process may track enough information when constructing sub-paths to intermediate nodes in the network so that the right decision may be made for the remainder of the end-to-end path. This decision may be based on learning which channel is the bottleneck channel for a path between a source and destination pair. The decision may also be based on identifying a minimum cost path for that bottleneck channel.

In some embodiments, procedure 500 may maintain a vector of $X_j$ values for each channel while generating a hop-by-hop routing table by assuming that a particular channel i is the bottleneck channel. Procedure 500 may also run separate instances for each channel used in the network, assuming in each instance that a different channel is the bottleneck channel. Procedure 500 may also construct a matrix of channel metrics and identify the appropriate bottleneck channel and best path for each destination node in the network.

In some embodiments, procedure 500 maintains a vector of $X_j$ values for each channel in place of the cost. The resulting tuple may be (Node, [$X_1$, $X_2$, $X_j$], NextHop). In some embodiments, "NextHop" may specify both the identity of a neighboring node and a communication channel to reach that node. This may be used to accommodate some embodiments of the present invention in which more than one channel may be available for reaching a particular neighbor node, although the scope of the invention is not limited in this respect. Procedure 500 may allow a node in the network to identify the route from itself to any destination in the network by assuming a particular channel i is the bottleneck channel.

For example, in operation 502, a confirmed route list may be initialized with an entry for "self" comprising a vector of zero-value $X_j$ values. In operation 504, for a node just added to the confirmed list (i.e., "next node"), its link-state entry may be selected. In operation 506, for each neighbor node of "next node", the set of one or more links that exist in the link-state entry are identified between "next node" and the neighbor node.

Operation 510 may be performed when operation 508 determines the current node (i.e., "next node") is not on the confirmed list. In operations 510 and 512, for each link between the current node and the next node, a vector of Xj values may be calculated to reach the node using the current link. Starting with the current vector of Xj values from the current node to the next node, the Xj value may be identified corresponding to the channel on which link is configured and it may be added to the cost for traversing the link.

In operations 514 and 516, if a route to node is currently neither in the confirmed nor the tentative list, the current node (Node, [$X_1$, $X_2$, $X_j$], NextHop) is added to the tentative list and "NextHop" refers to the next hop neighbor node.

In operation 526, if a node is currently on the tentative list, the updated vector of $X_j$ values may be compared to the $X_j$ vector currently listed for the node. When comparing the two vectors, a vector may be chosen that first minimizes the value of $X_j$ for the assumed bottleneck channel i and second minimizes the maximum value for all $X_j$ values in the vector, although the scope of the invention is not limited in this respect. In some embodiments, a function such as a weighted cumulative expected transmission time (WCETT) metric function described below may be used. In operation 530, if the new vector is chosen, the entry in the tentative list may be replaced with (Node, [$X_1$, $X_2$, $X_j$], NextHop).

In operation 522, when the tentative list is empty, procedure 500 may be completed in operation 532. If the tentative list is not empty, operation 524 may be performed and the entry may be selected from the tentative list using the selection criteria above. The entry may be moved to the confirmed list, and operation 504 may be performed.

After running an instance of procedure 500, a node may have a vector of $X_j$ values and next-hop routes for each destination in the network, assuming that a particular channel i is the bottleneck channel. In some embodiments, to identify the best end-to-end path to a destination, a node may first learn which channel is the bottleneck channel for a path between a source and destination pair and second identify the minimum cost path for the bottleneck channel. Procedure 500 may provide a mechanism for identifying the $X_j$ cost values and best next hop route assuming that a particular channel is the bottleneck channel. In order to identify the bottleneck channel, a separate instance of procedure 500 may be performed for each channel in the network. Each instance of procedure 500 may produce a vector of $X_j$ values, where the vectors correspond to the paths from the node to each destination.

For example, given a multichannel mesh network with k channels, k instances of procedure 500 may be used to produce a k×k matrix of $X_j$ values for each destination node. The number of channels k may range from one to three or more. Each row in the matrix may include a vector of $X_j$ values (i.e., one for each potential bottleneck channel i). Each row j represents a vector of $X_i$ values for the path that would be optimal if the $j^{th}$ channel were to be the bottleneck channel in the final end-to-end path between source and destination nodes. Each row may also include the best next hop identified by each instance of procedure 500. In example matrix 402 (FIG. 4A), node "1" has identified that the best path to destination node "4" that is optimized for channel one will have a metric of one for both channel one and channel two, while the best path that is optimized for channel two will have a metric of two for channel one and a metric of zero for channel two.

In some embodiments, to select the best end-to-end route to a particular destination node, the end-to-end metric for each row in the matrix may be computed. For example, in some embodiments, the row of the matrix that minimizes the maximum value in that row may be selected. Alternatively, the row that minimizes a WCETT metric function may be selected. Note that a matrix of channel metrics provides a pruned set of statistics that can be used to compute the actual bottleneck channel and end-to-end routing metric for each destination. For example, to compute a WCETT routing metric from a matrix, the following equation may be used to compute the WCETT metric for each row in the matrix:

$$WCETT = (1-\beta) * \sum_{i=1}^{k} X_i + \beta * \max_{i=1}^{k} X_i,$$

where k is the total number of channels in use in the network. The row with the minimum WCETT metric value may represent a best path metric for the node to reach the destination. By using a matrix of channel metrics, the cost and path information for each potential bottleneck channel may be preserved. This may avoid some of the pitfalls of traditional link-state approaches in which the end-to-end path selection is incorrectly dependent on sub-path selection.

In this way, a node may use this process to identify the bottleneck channel and next hop to each destination in the network from a matrix of channel metrics for each destination (as described above). After identifying the best next-hop to a destination, the node may update its local routing table with a routing table entry from itself to the destination. This routing entry may be used for routing packets to the destination that is originated at this node.

In some embodiments, to enable forwarding of traffic originated at other source nodes in the network, a node may also update its local routing table with a next-hop route entry to reach the destination for each potential bottleneck channel. This may allow the node to forward packets along the best end-to-end path when it operates as an intermediate router node in the network.

Unlike traditional forwarding tables that simply include a destination and next-hop pair for each routing table entry, some embodiments of the present invention allow different forwarding decisions to be made for different source/destination pairings. For instance, multiple routes between the same source and different destination nodes that traverse the same intermediate node may use a different sub-path from the intermediate node to the source, although the scope of the invention is not limited in this respect. For example, in some embodiments, two packets from different source nodes may use a different next hop to reach the same destination because the bottleneck channel for each end-to-end path may differ. Thus, in order for an intermediate node to be able to forward a packet from a source node along the optimal end-to-end path, the intermediate node may forward the packet to the best next-hop toward the destination corresponding to the bottleneck channel for the end-to-end path. The bottleneck channel may be identified by the source or destination node and may not be known by intermediate nodes in the path.

In some embodiments, a source node may generate a data message for a destination, and may insert an identifier or tag identifying the bottleneck channel into the packet header. As the packet is forwarded hop-by-hop though the network, each mesh node reads the bottleneck channel and destination from the packet header, looks up the next hop entry for the destination and the identified bottleneck channel from the local routing table, and forwards the message to the appropriate next-hop. Accordingly, source and destination nodes may communicate across a multi-channel mesh network using a best end-to-end path.

Although the individual operations of procedure 500 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multichannel mesh network comprising a plurality of nodes that communicate over one or more of a plurality of communication channels, wherein the nodes generate channel-metric matrices for destination nodes of the network, the channel-metric matrices identifying next hop nodes for each of a plurality of bottleneck channels, wherein source nodes tag originating packets to identify one of the bottleneck channels associated with a destination node of the originating packets, wherein intermediate nodes select a next-hop node and one of the communication channels for forwarding received packets from one of the channel-metric matrices based on the destination node and the bottleneck channel identified within the received packets, wherein the bottleneck channel for a destination node is a channel having a minimum channel metric vector, wherein use of the bottleneck channel is in forwarding packets to the destination node is minimized.

2. The network of claim 1 wherein source nodes identify one of the bottleneck channels for each destination node to increase diversity among the plurality of communication channels used on a route to a destination node.

3. The network of claim 2 wherein source nodes are adapted to route originating packets to a next hop node selected from one of the channel-metric matrices associated with an originating packet's destination node and transmit the originating packets to the next hop node using a communication channel associated with the next hop node.

4. The network of claim 2 wherein when generating the channel-metric matrices for the destination nodes within the network, the nodes construct paths through the network to destination nodes on a hop-by-hop basis, and wherein the nodes separately retain cost contributions of each of the communication channels in the form of a channel metric vector for each candidate path.

5. The network of claim 1 wherein the intermediate nodes use one of the channel-metric matrices associated with the destination node of a received packet to identify the next hop node and one of the communication channels for transmitting the received packet to the next hop node.

6. The network of claim 5 wherein when packets arrive at intermediate nodes, the intermediate nodes select a channel-metric matrix associated with the received packet's destination node, identify the received packet's bottleneck channel from the tag, and transmit the received packet to a next-hop node using one of the communication channels determined from the selected channel-metric matrices based on the bottleneck channel.

7. The network of claim 1 wherein the communication channels comprise orthogonal multicarrier communication channels, each communication channel comprising a plurality of symbol-modulated subcarriers.

8. A multichannel mesh network comprising a plurality of nodes that communicate over one or more of a plurality of communication channels, wherein the nodes generate channel-metric matrices for destination nodes of the network, the channel-metric matrices identifying next hop nodes for each of a plurality of bottleneck channels, wherein source nodes tag originating packets to identify one of the bottleneck channels associated with a destination node of the originating packets, wherein intermediate nodes select a next-hop node and one of the communication channels for forwarding received packets from one of the channel-metric matrices based on the destination node and the bottleneck channel identified within the received packets, wherein source nodes identify one of the bottleneck channels for each destination node to increase diversity among the plurality of communication channels used on a route to a destination node, wherein source nodes are adapted to route originating packets to a next hop node selected from one of the channel-metric matrices associated with an originating packet's destination node and transmit the originating packets to the next hop node using a communication channel associated with the next hop node, wherein the channel-metric matrices generated by the nodes for each destination node comprise a channel metric vector for next-hop nodes, the channel metric vector comprising a channel metric for each of the communication channels indicating a usage of the communication channel for a path through the network to the destination node associated with the channel-metric matrix, wherein each channel metric vector has a maximum channel metric, and wherein the source nodes determine the bottleneck channel for a destination node by identifying the channel metric vector for a next-hop node having a minimum value of the maximum channel metrics.

9. The network of claim 8 wherein the elements of the channel metric vectors are each associated with one of the communication channels and comprise a weighted combination of one or more of a hop count, link bandwidth, airtime estimate, and data rate for the associated channels.

10. A multichannel mesh network comprising a plurality of nodes that communicate over one or more of a plurality of communication channels, wherein the nodes generate channel-metric matrices for destination nodes of the network, the channel-metric matrices identifying next hop nodes for each of a plurality of bottleneck channels, wherein source nodes tag originating packets to identify one of the bottleneck channels associated with a destination node of the originating packets, wherein intermediate nodes select a next-hop node and one of the communication channels for forwarding received packets from one of the channel-metric matrices based on the destination node and the bottleneck channel identified within the received packets, wherein source nodes identify one of the bottleneck channels for each destination node to increase diversity among the plurality of communication channels used on a route to a destination node, wherein when generating the channel-metric matrices for the destination nodes within the network, the nodes construct paths through the network to destination nodes on a hop-by-hop basis, and wherein the nodes separately retain cost contributions of each of the communication channels in the form of a channel metric vector for each candidate path, wherein the nodes are to further generate the channel-metric matrices by selecting a next hop node and an associated one of the communication channels for each bottleneck channel, the selected next hop node being associated with a vector having a lowest maximum channel metric.

11. A mesh router comprising:

processing circuitry to generate channel-metric matrices for destination nodes of a multi-channel wireless mesh network, the channel-metric matrices identifying next hop nodes for each of a plurality of bottleneck channels; and packet routing circuitry to, when the mesh router operates as an intermediate node, select a next-hop node and one of the communication channels for forwarding received packets from one of the channel-metric matrices based on the destination node and the bottleneck channel identified within the received packets, wherein when operating as a source node, the packet routing circuitry is adapted to tag originating packets to identify one of the bottleneck channels associated with a destination node of the originating packets, wherein the bottleneck channel for a destination node is a channel having a minimum channel metric vector, wherein the packet routing circuitry minimizes use of the bottleneck channel is in forwarding packets to the destination node.

12. The mesh router of claim 11 further comprising two or more transceivers to transmit packets to a next hop node on one of a plurality of communication channels identified in the channel-metric matrix for the selected next hop node, wherein when the mesh router operates as a source node, the packet routing circuitry identifies one of the bottleneck channels for each destination node wherein diversity among the plurality of communication channels used on a route to a destination node is increased.

13. The mesh router of claim 12 wherein when operating as a source node, the packet routing circuitry is adapted to route originating packets to a next hop node selected from one of the channel-metric matrices associated with the originating packet's destination node and transmit the originating packets to the next hop node using a communication channel associated with the next hop node.

14. The mesh router of claim 12 wherein the processing circuitry generates the channel-metric matrices for the destination nodes within the network by constructing paths through the network to destination nodes on a hop-by-hop basis, and wherein the processing circuitry separately retains cost contributions of each of the communication channels in the form of a channel metric vector for each candidate path.

15. The mesh router of claim 11 wherein when the mesh router operates as an intermediate node, the mesh router is adapted to use one of the channel-metric matrices associated with the destination node of a received packet to identify the next hop node and one of the communication channels for transmitting the received packet to the next hop node.

16. The mesh router of claim 15 wherein when operating as an intermediate node, the packet routing circuitry is adapted to select a channel-metric matrix associated with the received packet's destination node, and identify the received packet's bottleneck channel from the tag, and wherein the mesh router further comprises transceiver circuitry to transmit the received packet to a next-hop node using one of the communication channels determined from the selected channel-metric matrices based on the bottleneck channel.

17. The mesh router of claim 11 further comprising two or more transceivers for communicating over two or more communication channels comprising orthogonal multicarrier communication channels, each communication channel comprising a plurality of symbol-modulated subcarriers.

18. A mesh router comprising:

processing circuitry to generate channel-metric matrices for destination nodes of a multi-channel wireless mesh network, the channel-metric matrices identifying next hop nodes for each of a plurality of bottleneck channels;

packet routing circuitry to, when the mesh router operates as an intermediate node, select a next-hop node and one of the communication channels for forwarding received packets from one of the channel-metric matrices based on the destination node and the bottleneck channel identified within the received packets, wherein when operating as a source node, the packet routing circuitry is adapted to tag originating packets to identify one of the bottleneck channels associated with a destination node of the originating packets; and two or more transceivers to transmit packets to a next hop node on one of a plurality of communication channels identified in the channel-metric matrix for the selected next hop node, wherein when the mesh router operates as a source node, the packet routing circuitry identifies one of the bottleneck channels for each destination node wherein diversity among the plurality of communication channels used on a route to a destination node is increased, wherein when operating as a source node, the packet routing circuitry is adapted to route originating packets to a next hop node selected from one of the channel-metric matrices associated with the originating packet's destination node and transmit the originating packets to the next hop node using a communication channel associated with the next hop node, wherein the channel-metric matrices generated by the nodes for each destination node comprise a channel metric vector for next-hop nodes, the channel metric vector comprising a channel metric for each of the communication channels indicating a usage of the communication channel for a path through the network to the destination node associated with the channel-metric matrix, wherein each channel metric vector has a maximum channel metric, and wherein the source nodes determine the bottleneck channel for a destination node by identifying the channel metric vector for a next-hop node having a minimum value of the maximum channel metrics.

19. The mesh router of claim 18 wherein the elements of the channel metric vectors are each associated with one of the communication channels and comprise a weighted combination of one or more of a hop count, link bandwidth, airtime estimate, and data rate for the associated channels.

20. A mesh router comprising:

processing circuitry to generate channel-metric matrices for destination nodes of a multi-channel wireless mesh network, the channel-metric matrices identifying next hop nodes for each of a plurality of bottleneck channels; and packet routing circuitry to, when the mesh router operates as an intermediate node, select a next-hop node and one of the communication channels for forwarding received packets from one of the channel-metric matrices based on the destination node and the bottleneck channel identified within the received packets, wherein when operating as a source node, the packet routing circuitry is adapted to tag originating packets to identify one of the bottleneck channels associated with a destination node of the originating packets; and two or more transceivers to transmit packets to a next hop node on one of a plurality of communication channels identified in the channel-metric matrix for the selected next hop node, wherein when the mesh router operates as a source node, the packet routing circuitry identifies one of the bottleneck channels for each destination node wherein diversity among the plurality of communication channels used on a route to a destination node is increased, wherein the processing circuitry generates the channel-metric matrices for the destination nodes within the network by constructing paths through the network to destination nodes on a hop-by-hop basis, and wherein the processing circuitry separately retains cost contributions of each of the communication channels in the form of a channel metric vector for each candidate path, wherein the processing circuitry is adapted to further generate the channel-metric matrices by selecting a next hop node and an associated one of the communication channels for each bottleneck channel, the selected next hop node being associated with a vector having a lowest maximum channel metric.

21. The method of routing packets comprising:
communicating over one or more of a plurality of communication channels;
generating channel-metric matrices for destination nodes of a multichannel mesh network, the channel-metric matrices identifying next hop nodes for each of a plurality of bottleneck channels;
tagging originating packets to identify one of the bottleneck channels associated with a destination node of the originating packets; and
selecting a next-hop node and one of the communication channels for forwarding received packets from one of the channel-metric matrices based on the destination node and the bottleneck channel identified within the received packets,
wherein the bottleneck channel for a destination node is a channel having a minimum channel metric vector, wherein use of the bottleneck channel is in forwarding packets to the destination node is minimized.

22. The method of claim 21 further comprising a source node identifying one of the bottleneck channels for each destination node to increase diversity among the plurality of communication channels used on a route to a destination node.

23. The method of claim 22 further comprising:
routing originating packets to a next hop node selected from one of the channel-metric matrices associated with the originating packet's destination node; and
transmitting the originating packets to the next hop node using a communication channel associated with the next hop node.

24. The method of claim 23 further comprising generating the channel-metric matrices by the nodes for each destination node, the channel-metric matrices comprising a channel metric vector for next-hop nodes, the channel metric vector comprising a channel metric for each of the communication channels indicating a usage of the communication channel for a path through the network to the destination node associated with the channel-metric matrix,
wherein each channel metric vector has a maximum channel metric, and wherein the source nodes determine the bottleneck channel for a destination node by identifying the channel metric vector for a next-hop node having a minimum value of the maximum channel metrics.

25. The method of claim 24 wherein the elements of the channel metric vectors are each associated with one of the communication channels and comprise a weighted combination of one or more of a hop count, link bandwidth, airtime estimate, and data rate for the associated channels.

* * * * *

UNITED STATES PATENT AND TRADEMARK OFFICE
CERTIFICATE OF CORRECTION

PATENT NO. : 7,664,037 B2 Page 1 of 1
APPLICATION NO. : 11/030592
DATED : February 16, 2010
INVENTOR(S) : Conner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1427 days.

Signed and Sealed this

Twenty-eighth Day of December, 2010

David J. Kappos
*Director of the United States Patent and Trademark Office*